United States Patent [19]
Chen

[11] Patent Number: 6,070,493
[45] Date of Patent: Jun. 6, 2000

[54] BICYCLE PEDAL ASSEMBLY

[76] Inventor: Chung-I Chen, No. 3, Kung-Chi Road, Yu-Si-Kung-Yeh Dist., Ta-Chia Chen, Taichung Hsien, Taiwan

[21] Appl. No.: 09/249,407

[22] Filed: Feb. 12, 1999

[51] Int. Cl.[7] ................................................... B62M 3/08
[52] U.S. Cl. .......................................... 74/594.6; 74/594.4
[58] Field of Search .............................. 74/594.6, 594.4; 36/131

[56] References Cited

U.S. PATENT DOCUMENTS

| | | | |
|---|---|---|---|
| 5,806,379 | 9/1998 | Nagano | 74/594.6 |
| 5,916,332 | 6/1999 | Chen | 74/594.6 |

*Primary Examiner*—Mary Ann Battista
*Attorney, Agent, or Firm*—Fish & Richardson P.C.

[57] ABSTRACT

A bicycle pedal assembly includes a pedal body having a tubular portion in a first transverse direction for rotatably mounting on a pedal shaft, right and left pairs of lateral walls which extend from front and rear ends of the tubular portion in a longitudinal direction to form rightmost and leftmost pairs of front and rear end portions and rightmost and leftmost bracing walls which are spaced from each other in the longitudinal direction and which interconnect the rightmost and leftmost pairs of the front and rear end portions. Two mounting holes are formed in the front and rear lateral walls of the right pair and are aligned with each other in the first transverse direction in symmetry to another two of the mounting holes formed in the front and rear lateral walls of the left pair. Two cleat engaging devices are mounted on the upper and lower surfaces of the pedal body, and include two forward and rearward anchor members disposed to be in symmetry relative to an axis of the tubular portion.

7 Claims, 7 Drawing Sheets

BICYCLE PEDAL ASSEMBLY

BACKGROUND OF THE INVENTION

1. Field of the Invention

The invention relates to a pedal assembly, more particularly to a bicycle pedal assembly.

2. Description of the Related Art

Figure 1:
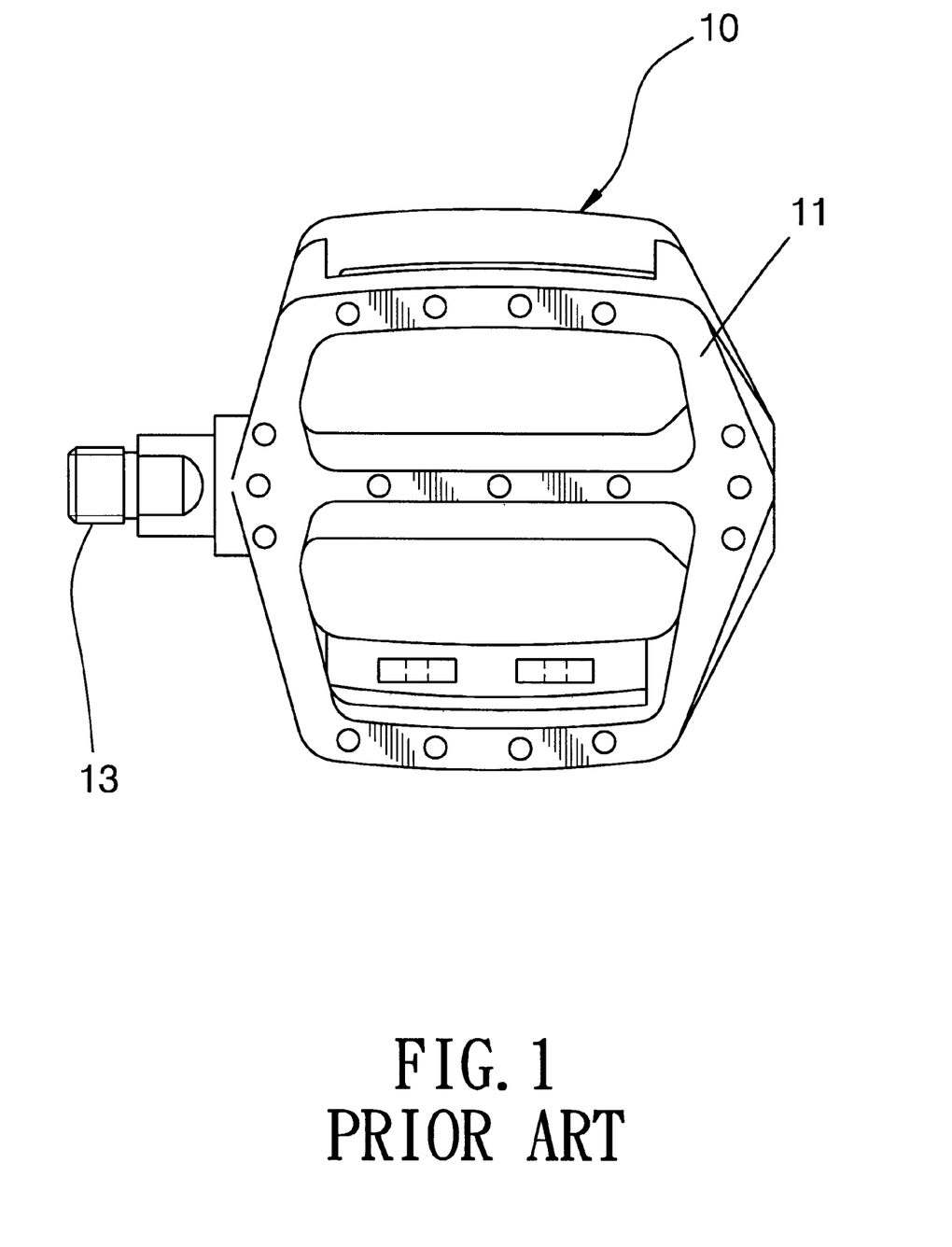
FIG. 1 is a perspective view of a conventional bicycle pedal assembly.

Referring to FIG. 1, a conventional bicycle pedal assembly 10 is shown to include a rectangular pedal body 11 having a central tubular portion 13 adapted to be mounted on a bicycle pedal shaft (not shown). Such type of pedal assembly is not suitable for use in a racing bicycle because the pedal body 11 thereof is not provided with a cleat engaging device for engaging a cleat unit which is fixed to the bottom sole of the cyclist's shoe.

Figure 2:
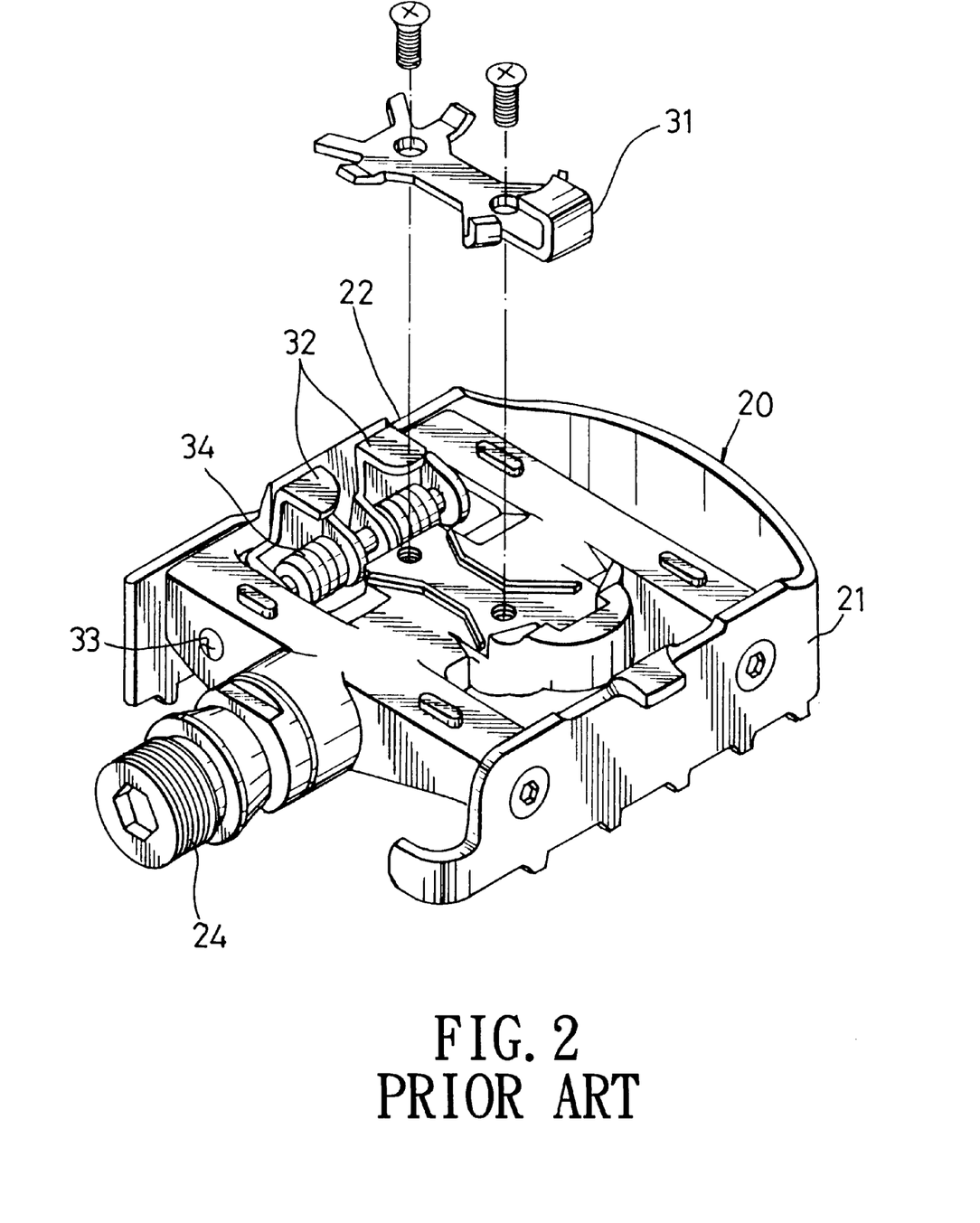
FIG. 2 is a partly exploded view of another conventional bicycle pedal assembly.

Referring to FIG. 2, a known bicycle pedal assembly adapted to be used in a racing bicycle is shown to include a pedal body 20, and a cleat engaging device consisting of forward and rearward anchor members 31, 32, a mounting axle 33, and a coil spring 34. The pedal body 20 has a tubular portion 24 adapted to be mounted on a bicycle pedal shaft (not shown) around a first axis, and front and rear portions 21, 22 spaced apart from each other in a first transverse direction relative the first axis. The forward anchor member 31 is mounted on the front portion 21, while the rearward anchor member 32 is mounted pivotally on the rear portion 22 via the mounting axle 33. The coil spring 34 is sleeved around the axle 33 to bias the rearward anchor member 32 to move toward and cooperate with the forward anchor member 31 to engage a cleat unit which is fixed to a cyclist's shoe.

Although, the aforesaid pedal assembly is useful in ordinary and racing bicycles, some disadvantages still exist, such as the forward and rearward anchor members 31, 32, the coil spring 34, and the mounting axle 33 must be dismantled from the pedal body 20 one by then only the latter can be comfortably pedaled by the cyclist.

SUMMARY OF THE INVENTION

Therefore, the object of this invention is to provide a bicycle pedal assembly that is adapted to be mounted on a bicycle pedal shaft and that can overcome the aforementioned disadvantage that is associated with the conventional bicycle pedal assembly.

Accordingly, the bicycle pedal assembly of this invention includes a pedal sub-assembly adapted to be mounted on a bicycle pedal shaft around a first axis, and a pair of cleat engaging devices. Each of the cleat engaging devices is adapted to engage a cleat unit which is fixed to a bottom surface of a sole of a cyclist's shoe, and includes a mount body having a hollow tube disposed to extend in a first transverse direction parallel to the pedal shaft. The hollow tube has first front and rear ends and a middle portion disposed between the first front and rear ends. A bridge member has a first proximate end connected to the middle portion of the hollow tube, and a first distal end opposite to the first proximate end in a first longitudinal direction transverse to the first transverse direction. A frame member has first and second side arms respectively extending from the first distal end of the bridge member in the first longitudinal direction. The first and second side arms are spaced apart from each other in the first transverse direction so as to form first and second journalled side walls which define therebetween a rotating second axis parallel to the first transverse direction and normal to the first and second journalled side walls. First and second lug members are respectively disposed on and outboard to the first and second jounralled side walls, and extend in the first transverse direction so as to be secured and tightened in a second transverse direction which is transverse to both of the first transverse and longitudinal directions. A forward anchor member is fixedly secured to the middle portion of the hollow tube. A rearward anchor member is disposed between the first and second journalled side walls and is turnable about the rotating second axis. A biasing member is disposed to bias the rearward anchor member to turn toward the forward anchor member for clamping the cleat unit in the first longitudinal direction in cooperation with the forward anchor member. The pedal sub-assembly includes a tubular portion adapted to be mounted rotatably on the pedal shaft around the first axis, and has second front and rear end walls in the first transverse direction. Right and left pairs of front and rear lateral walls extend from the second front and rear end walls rightward and leftward in the first longitudinal direction to form rightmost and leftmost pairs of front and rear end portions, respectively. Each of the lateral walls has upper and lower surfaces opposite to each other in the second transverse direction. Rightmost and leftmost bracing walls are disposed opposite to each other in the first longitudinal direction and interconnect the rightmost and leftmost pairs of the front and rear end portions respectively so as to constitute uninterrupted upper and lower peripheral portions respectively on the upper and lower surfaces of the lateral walls. Each of the right and left pairs of front and rear lateral walls has a pair of mounting holes respectively disposed in the front and rear lateral walls in alignment with each other in the first transverse direction and outboard to the first front and rear ends respectively so as to constitute a third axis parallel to the first transverse direction. The pairs of mounting holes are disposed to be proximate to the rightmost and leftmost bracing walls respectively and proximate to the upper and lower surfaces of the lateral walls and in symmetry to each other relative to the first axis. Each of the front and rear lateral walls of a respective one of the right and left pairs has a set of upper and lower abutment walls which are spaced apart from each other in the second transverse direction so as to define an accommodation channel that provides passage in the first transverse direction and to receive a respective one of the lug members. The sets of upper and lower abutment walls in the right pair are disposed distal to the rightmost bracing wall relative to the first axis, and in symmetry to the other sets of upper and lower abutment walls in the left pair, respectively. Each of the sets of upper and lower abutment walls further defines upper and lower tightening holes therein which are aligned with each other so as to constitute a fourth axis with the respective one of the lug members parallel to the second transverse direction, thereby permitting the respective one of the lug members to be tightened between the respective set of the upper and lower abutment walls along the fourth axis.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

The preferred embodiment of a bicycle pedal assembly according to this inventions is adapted to be mounted on a bicycle pedal shaft around a first axis and is adapted to engage a cleat unit (not shown) which has forward and rearward ends and which is fixed to a bottom surface of a sole of a cyclist's shoe.

Figure 3:
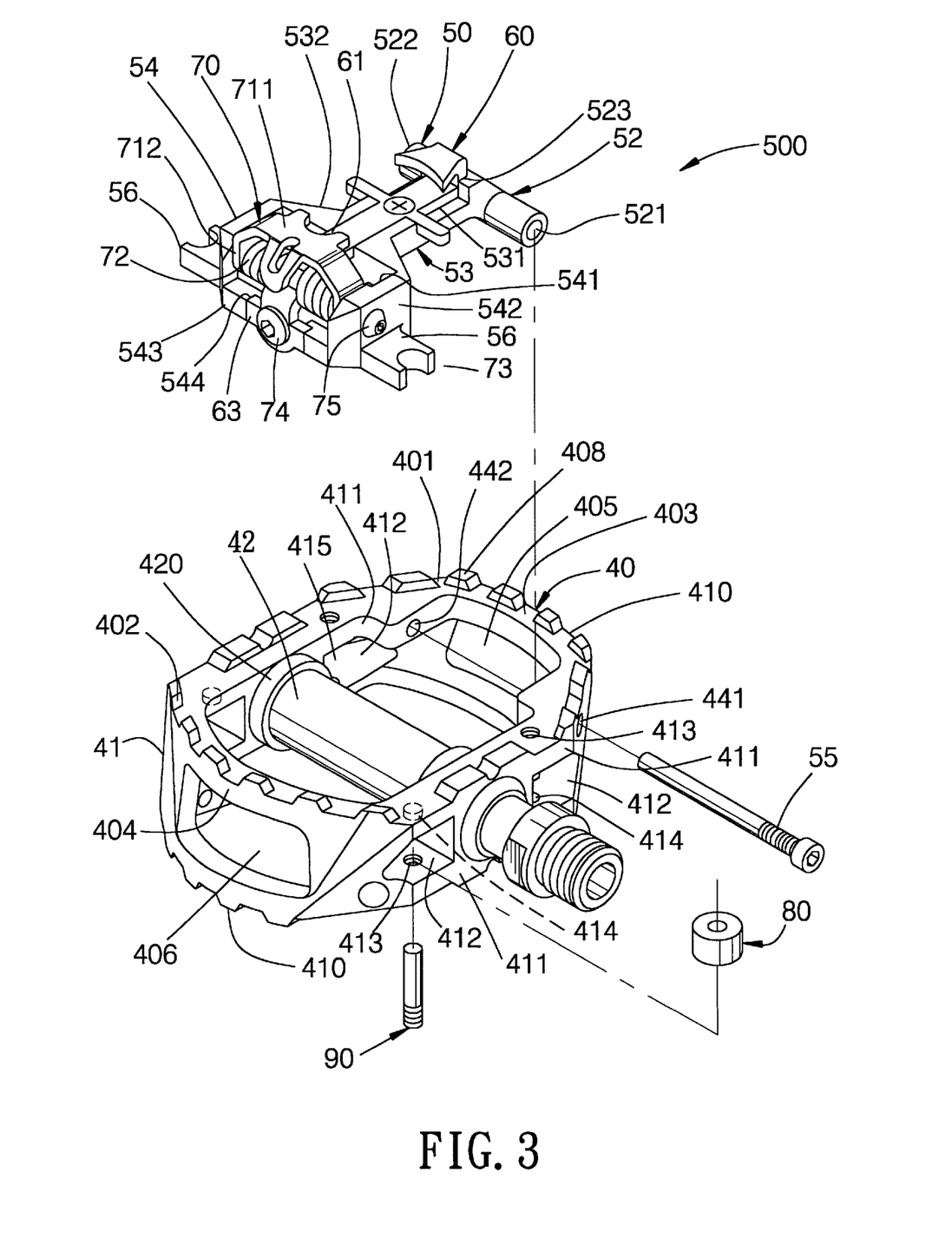
FIG. 3 is an exploded view of a preferred embodiment of a bicycle pedal assembly according to this invention.
Figure 4:
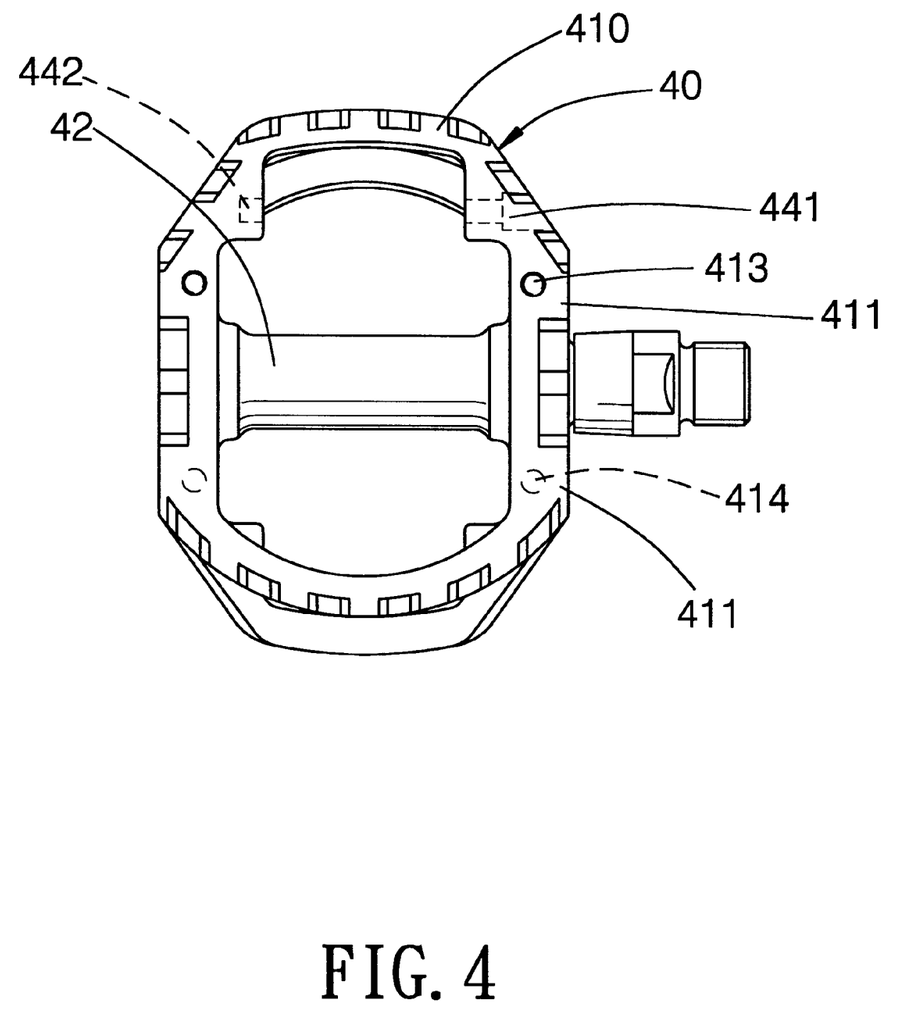
FIG. 4 is a top plan view of a pedal body of the preferred embodiment without a cleat engaging device mounted thereto.
Figure 5:
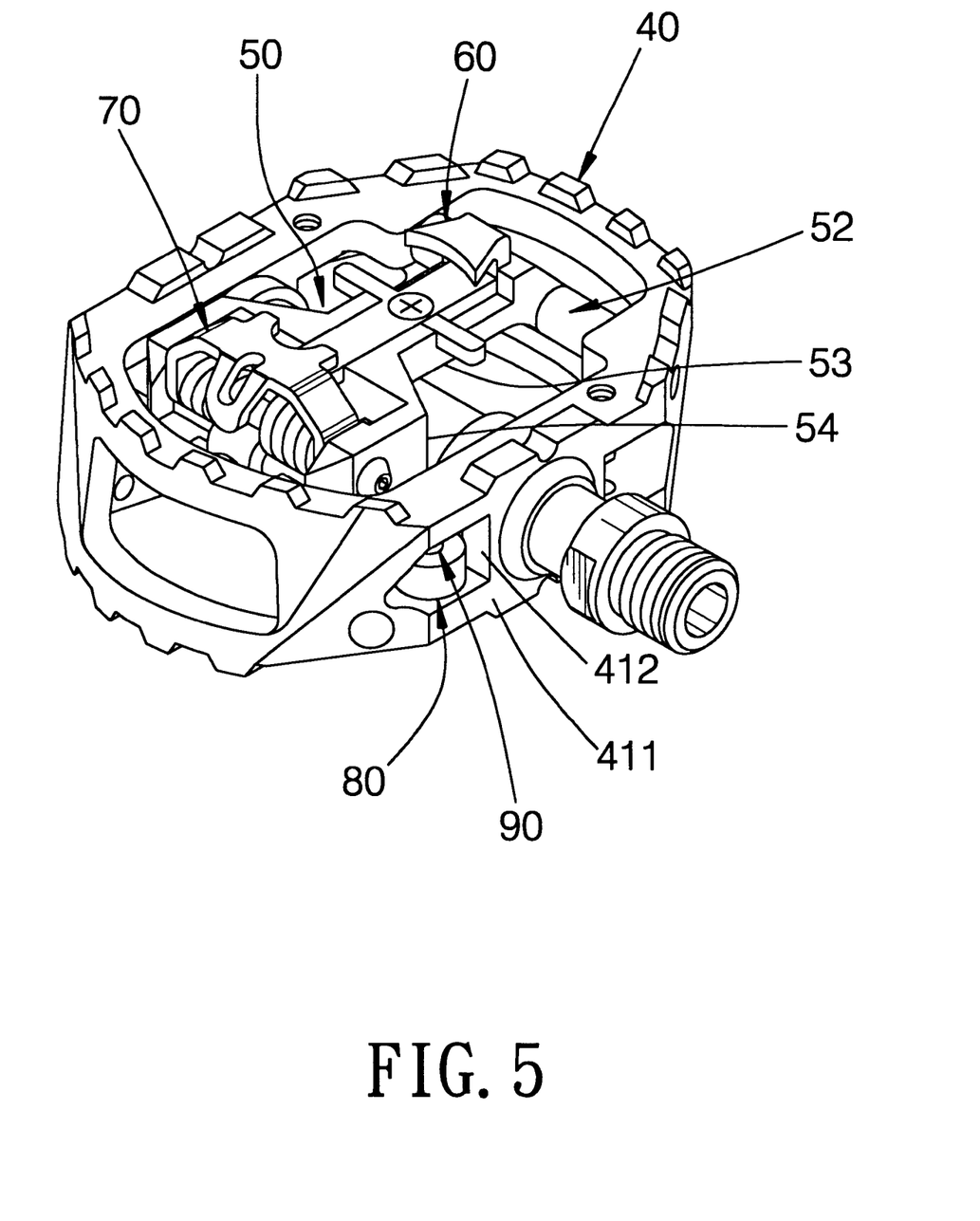
FIG. 5 is a perspective view of the preferred embodiment.

Referring to FIGS. 3, 4 and 5, the preferred embodiment includes a pedal sub-assembly consisting of a one-piece pedal body 40, and a pair of cleat engaging devices 500 (only one is shown in FIG. 3).

As illustrated, each of the cleat engaging devices 500 is adapted to engage a cleat unit (not shown) which is fixed to a bottom surface of a sole of a cyclist's shoe, and includes a mount body 50, a forward anchor member 60, a rearward anchor member 70, and a biasing member 72.

The mount body 50 includes a hollow tube 52 disposed to extend in a first transverse direction parallel to the pedal shaft, and has first front and rear ends 521, 522 and a middle portion 523 disposed between the first front and rear ends 521, 522. The mounting body 50 further includes a bridge member 53 which has a first proximate end 531 connected to the middle portion 523 of the hollow tube 52 and a first distal end 532 opposite to the first proximate end 531 in a first longitudinal direction transverse to the first transverse direction, and a frame member 54. The frame member 54 has first and second side arms 542 which respectively extend from the first distal end 532 in the first longitudinal direction. The first and second side arms 542 are spaced apart from each other in the first transverse direction so as to form first and second journalled side walls 541 which define therebetween a rotating second axis 73 parallel to the first transverse direction. The rotating second axis 73 is normal to the first and second journalled side walls 541. First and second lug members 56 are disposed on and outboard to the first and second journalled side walls 541, respectively. The lug members 56 extend in the first transverse direction so as to be secured and tightened in a second transverse direction which is transverse to both of the first transverse and longitudinal directions.

The forward anchor member 60 is fixedly secured to the middle portion 523 of the hollow tube 52.

The rearward anchor member 70 is disposed between the first and second journalled side walls 541 and is turnable about the rotating second axis 73.

The biasing member 72, in the form of a coil spring, is disposed to bias the rearward anchor member 70 to turn toward the forward anchor member 60 for clamping the cleat unit in the first longitudinal direction in cooperation with the forward anchor member 60.

The pedal body 40 has a tubular portion 42 adapted to be mounted rotatably on the bicycle pedal shaft around the first axis, second front and rear end walls 420 in the first transverse direction, and right and left pairs of front and rear lateral walls 411 which extend from the second front and rear end walls 420 rightward and leftward in the first longitudinal direction to form rightmost and leftmost pairs of front and rear end portions 401, 402, respectively. Each of the lateral walls 411 has upper and lower surfaces opposite to each other in the second transverse direction. Rightmost and leftmost bracing walls 403, 404 are disposed opposite to each other in the first longitudinal direction and interconnect the rightmost and leftmost pairs of the front and rear end portions 401, 402 respectively so as to constitute uninterrupted upper and lower peripheral portions 410 respectively on the upper and lower surfaces of the lateral walls 411.

Each of the right and left pairs of the front and rear lateral walls 411 has a pair of mounting holes 441, 442 formed therein in alignment with each other in the first transverse direction and outboard to the first front and rear ends 521, 522 of the hollow tube 52 so as to constitute a third axis 55 parallel to the first transverse direction. The pairs of mounting holes 441, 442 in the right and left pairs of the lateral walls 411 are disposed to be proximate to the rightmost and leftmost bracing walls 401, 402 respectively and proximate to the upper and lower surfaces of the lateral walls 411 in symmetry to each other relative to the first axis.

Each of the front and rear lateral walls 411 of a respective one of the right and left pairs has a set of upper and lower abutment walls 412 which are spaced apart from each other in the second transverse direction so as to define an accommodation channel 415 which provides passage in the first transverse direction to receive a respective one of the lug members 56.

The sets of the upper and lower abutment walls 412, which are disposed in the right pair, are disposed distal to the rightmost bracing wall 403 relative to the first axis, and are in symmetry to two sets of the other upper and lower abutment walls 412 in the left pair, respectively.

Each of the sets of upper and lower abutment walls 412 further defines upper and lower tightening holes 413, 414 therein which are aligned with each other so as to constitute a fourth axis with the respective one of the lug members 56 parallel to the second transverse direction, thereby permitting the respective one of the lug members 56 to be tightened between the respective set of the upper and lower abutment walls 412 along the fourth axis.

Figure 6:
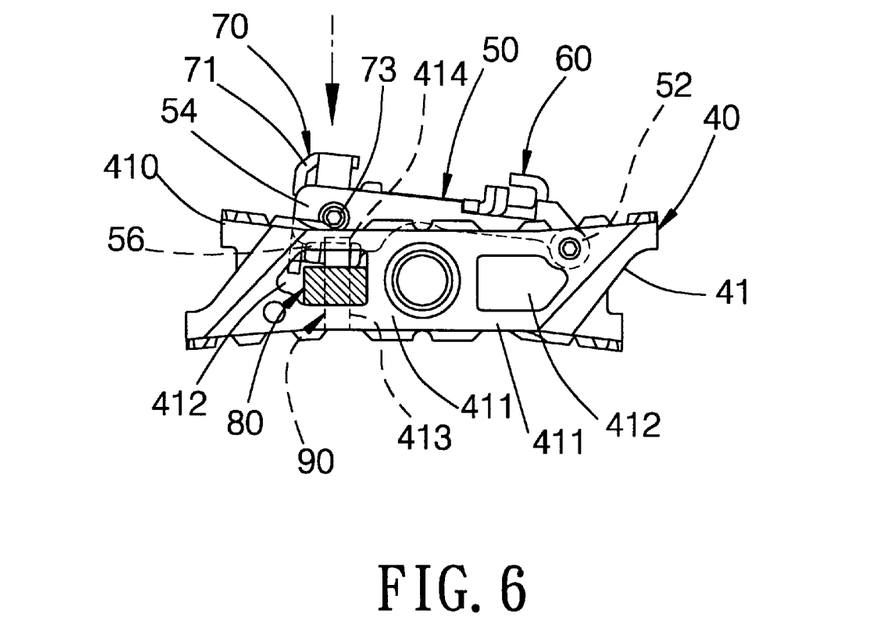
FIGS. 6 and 7 respectively illustrate how the shock absorbing elements employed in the preferred embodiment deform in order to absorb the vibrations of the pedal body shown in FIG. 4.
Figure 7:
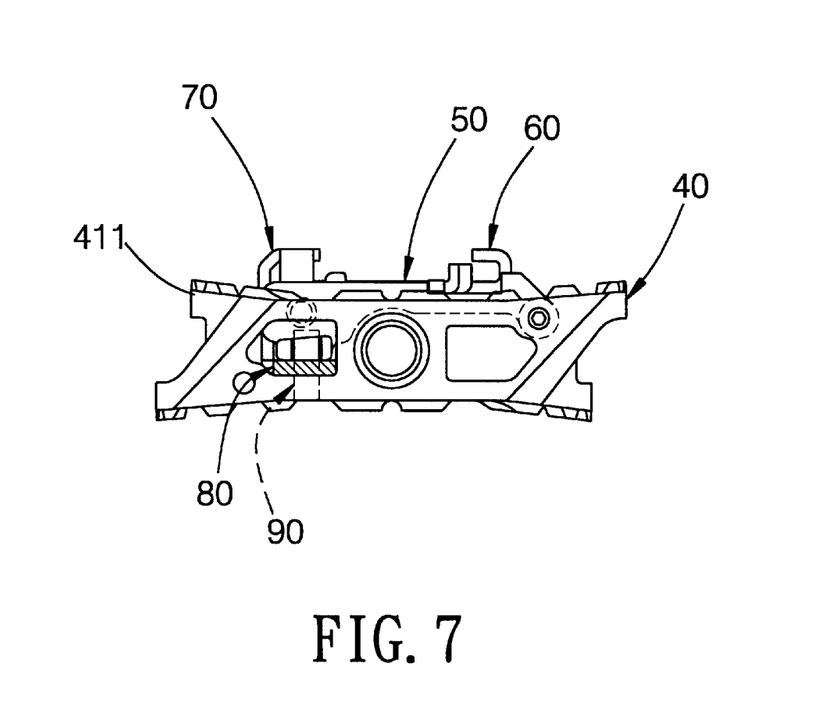

The preferred embodiment further includes two mounting pivots 75, each of which is inserted along the second axis and through the journalled side walls 541 of the frame member 54 for mounting pivotally the rearward anchor member 70. A plurality of embossed members 408 project outwardly in the second transverse direction from the upper and lower surface of the lateral walls 411 to provide stable engagement between the cyclist's shoe and the pedal body 40 in case that the cleat engaging devices 500 are detached from the pedal body 40. Right and left mounting shafts 55 are inserted along the third axis into the mounting holes 441, 442 in the lateral walls 411 so as to mount the hollow tube 52 between corresponding pair of the lateral walls 411. Right and left elastomeric shock absorbing elements 80 (only one is shown in FIG. 3) can be inserted into a corresponding one of the accommodating channels 415 defined by the abutment walls 413, 414 so as to cushion and urge a corresponding one of the lug members 56 in the second transverse direction to bias against the upper abutment wall 412, thereby preventing pivotal action of the hollow tube 52 and subsequently absorb the vibration of the lug members 56. To further secure the shock absorbing elements 80 and the lug members 56 in the accommodating channel 415, a pair of fastener screws 90 can be inserted along the fourth axis into the channel 415 and through the lug members 56 and the shock absorbing elements 80 such that vibrations of the cleat engaging device 500 relative to the pedal body 40 will deform the shock absorbing members 80, as best shown in FIGS. 6 and 7.

Note that in the preferred embodiment, the hollow tube 52, the bridge member 53, the frame member 54, and the lug members 56 are integrally formed with one another. The rearward anchor member 70 has two lug portions 712 which permit extension of the mounting pivot 75 in the first transverse direction, a grip portion 711 which projects uprightly from the lug portions 712 to an elevation higher than an upper surface of the frame member 54, and a spring rest portion (not visible) which is disposed below the grip portion 711 and which is biased by one end of the coil spring 72 such that the grip portion 711 is urged to move toward the forward anchor member 60. The rear portion 543 of the frame member 54 further defines a rearward opening 544 to accommodate and to immobilize a bolt mounting member 63 via which an adjustment bolt 74 is threadedly inserted in the first longitudinal direction. A biasing force adjusting member (not visible) is disposed proximate to the mounting pivot 75 and is biased by the other end of the coil spring 72 to move toward the forward anchor member 60. The biasing force adjusting member is threaded to the adjustment bolt 74 in such a manner that rotation of the adjustment bolt 74 relative to the biasing force adjusting member will vary a distance therebetween, thereby varying the biasing force of the coil spring 72. Note that the bolt mounting member 63 is provided with a restricting stem 61 (see FIG. 3) which extends in the first longitudinal direction toward the forward anchor member 60 to restrict the biasing force adjusting member from concurrently rotating with the adjustment bolt 74.

Since the forward and rearward anchor members 60, 70 are permanently mounted on the mounting body 50, mere detachment of the mounting body 50 relative to the pedal body 40 can convert the latter for use in an ordinary bicycle.

Figure 8:
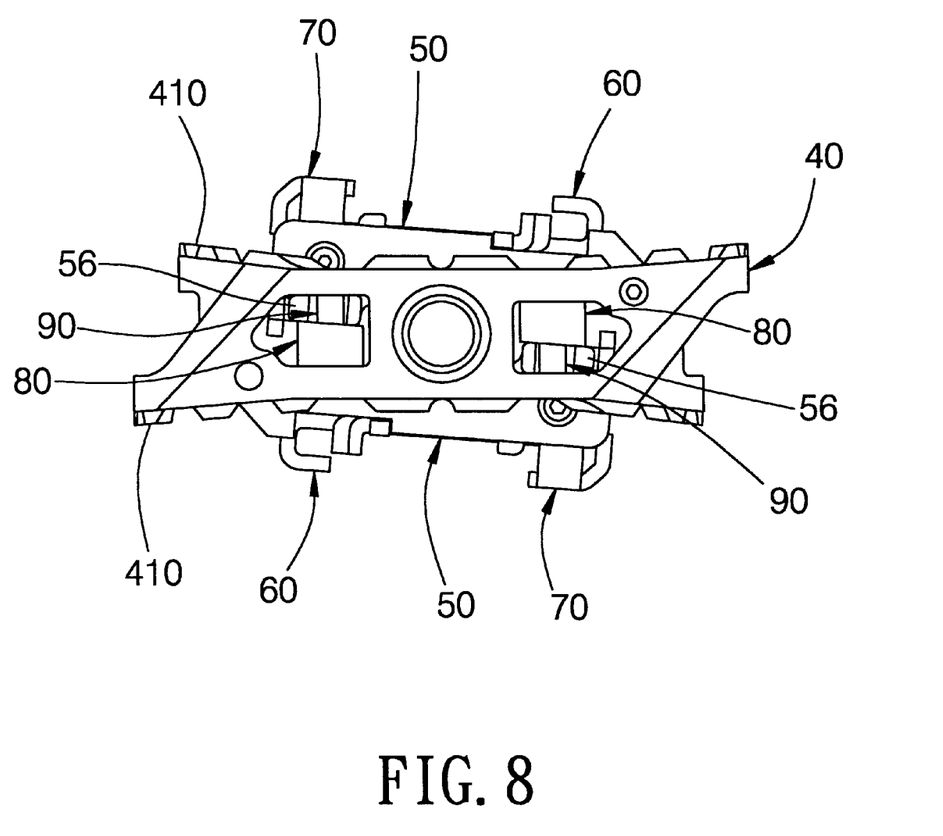
FIG. 8 is a side view of a modified preferred embodiment of this invention.

Referring to FIG. 8, a modified preferred embodiment of this invention is shown to be similar to the previous embodiment in construction, except in that two cleat engaging devices are mounted on the upper and lower surfaces of the pedal body 40 such that the corresponding forward and rearward anchor members 60, 70 are disposed to be in symmetry relative to the first axis of the pedal shaft. In order to facilitate adjustment of the biasing force of the coil springs 72 (see FIG. 3), the rightmost and leftmost bracing walls 403, 404 are provided with front and rear openings 405, 406 in the longitudinal direction via which biasing force adjustment can be performed.

With this invention thus explained, it is apparent that numerous modifications and variations can be made without departing from the scope and spirit of this invention. It is therefore intended that this invention be limited only as indicated in the appended claims.

I claim:
1. A bicycle pedal assembly comprising:
a pair of cleat engaging devices, each of said cleat engaging devices being adapted to engage a cleat unit which is fixed to a bottom surface of a sole of a cyclist's shoe, and including a mount body having:
a hollow tube disposed to extend in a first transverse direction parallel to a pedal shaft, said hollow tube having first front and rear ends, and a middle portion disposed between said first front and rear ends,
a bridge member having a first proximate end connected to said middle portion and a first distal end opposite to said first proximate end in a first longitudinal direction transverse to said first transverse direction, and
a frame member including first and second side arms respectively extending from said first distal end in said first longitudinal direction and spaced apart from each other in said first transverse direction so as to form first and second journalled side walls which define therebetween a rotating second axis parallel to said first transverse direction and normal to each of said first and second journalled side walls, and front and rear lug members respectively disposed on and outboard to said first and second journalled side walls and extending in said first transverse direction so as to be secured and tightened in a second transverse direction which is transverse to both of said first transverse and longitudinal directions,
a forward anchor member fixedly secured to said middle portion,
a rearward anchor member disposed between said first and second journalled side walls and turnable about said rotating axis, and
a biasing member disposed to bias said rearward anchor member to turn toward said forward anchor member for clamping the cleat unit in said first longitudinal direction in cooperation with said forward anchor member; and
a pedal sub-assembly including
a tubular portion adapted to be mounted rotatably on the pedal shaft around a first axis, and having second front and rear end walls in the first transverse direction,
right and left pairs of front and rear lateral walls extending respectively from said second front and rear end walls rightward and leftward in said first longitudinal direction to form rightmost and leftmost pairs of front and rear end portions respectively, each of said lateral walls having upper and lower surfaces opposite to each other in said second transverse direction, and
rightmost and leftmost bracing walls disposed opposite to each other in said first longitudinal direction and interconnecting said rightmost and leftmost pairs of said front and rear end portions respectively so as to constitute uninterrupted upper and lower peripheral portions respectively on said upper and lower surfaces of said lateral walls,
each of said right and left pairs of front and rear lateral walls having a pair of mounting holes respectively disposed in said front and rear lateral walls in alignment with each other in said first transverse direction and adapted to be outboard to the first front and rear ends respectively so as to constitute a third axis parallel to said first transverse direction, said pairs of mounting holes being disposed to be proximate to said rightmost and leftmost bracing walls respectively and proximate to said upper and lower surfaces of said lateral walls in symmetry to each other relative to said first axis;
each of said front and rear lateral walls of a respective one of said right and left pairs having a set of upper and lower abutment walls spaced apart from each other in said second transverse direction so as to define an accommodation channel which provides passage in said first transverse direction to receive a respective one of said front and rear lug members;

said two sets of upper and lower abutment walls which are disposed in said right pair of front and rear lateral walls respectively, being disposed distal to said rightmost bracing wall relative to said first axis, and in symmetry to the other said sets of upper and lower abutment walls in said left pair of front and rear lateral walls respectively;

each of said sets of upper and lower abutment walls in said right and left pairs further defining upper and lower tightening holes therein which are aligned with each other so as to constitute a fourth axis with the respective one of said lug members parallel to said second transverse direction, thereby permitting the respective one of said lug members to be tightened between the respective set of said upper and lower abutment walls along said fourth axis.

2. The bicycle pedal assembly as defined in claim 1, further comprising a mounting pivot inserted along said rotating axis and through said journalled side walls of said frame member for mounting said rearward anchor member.

3. The bicycle pedal assembly as defined in claim 1, further comprising a plurality of embossed members projecting outwardly in said second transverse direction from said upper and lower surfaces of said lateral walls to provide stable engagement between the cyclist's shoe and the pedal sub-assembly in case that said cleat engaging devices are detached from the pedal sub-assembly.

4. The bicycle pedal assembly as defined in claim 1, further comprising right and left mounting shafts respectively inserted along said third axis into said mounting holes formed in said lateral walls of a corresponding one of said right and left pairs to mount said hollow tube between a respective pair of said lateral walls.

5. The bicycle pedal assembly as defined in claim 4, further comprising right and left pairs of elastomeric shock absorbing elements respectively press-fitted in said accommodating channel along said first transverse direction to cushion and urge a corresponding one of said lug members upright in said second transverse direction so as to bias against said upper abutment wall, thereby preventing pivotal action of said hollow tube relative to said mounting shaft and subsequently absorbing vibration of said lug members.

6. The bicycle pedal assembly as defined in claim 5, further comprising right and left pairs of fastener screws inserted along said fourth axis into said accommodating channel to pass through said lug members and said shock absorbing elements so as to be fastened in said upper and lower tightening holes of said upper and lower abutment walls of a corresponding one of said right and left pairs, thereby securing said lug members and said shock absorbing elements in said accommodating channel.

7. A bicycle pedal sub-assembly adapted to be mounted on a bicycle pedal shaft around a first axis and capable of being detachably mounted with a pair of cleat engaging devices, each of the cleat engaging devices being adapted to engage a cleat unit which is fixed to a bottom surface of a sole of a cyclist's shoe, and including:

a mount body having
    a hollow tube disposed to extend in a first transverse direction parallel to the pedal shaft, the hollow tube having first front and rear ends, and a middle portion disposed between the first front and rear ends,
    a bridge member having a first proximate end connected to the middle portion and a first distal end opposite to the first proximate end in a first longitudinal direction transverse to the first transverse direction, and
    a frame member including first and second side arms respectively extending from the first distal end in the first longitudinal direction, and spaced apart from each other in the first transverse direction so as to form first and second journalled side walls which define therebetween a rotating second axis parallel to the first transverse direction and normal to each of the first and second journalled side walls, and first and second lug members respectively disposed on and outboard to the first and second journalled side walls and extending in the first transverse direction so as to be secured and tightened in a second transverse direction which is transverse to both of the first transverse and longitudinal directions, a forward anchor member fixedly secured to the middle portion;

a rearward anchor member disposed between the first and second journalled side walls and turnable about the rotating second axis, and a biasing member disposed to bias the rearward anchor member to turn toward the forward anchor member so as to clamp the cleat unit in the first longitudinal direction in cooperation with the forward anchor member, said pedal sub-assembly comprising:
    a tubular portion adapted to be mounted rotatably on the bicycle pedal shaft around the first axis, and having second front and rear end walls in the first transverse direction;
    right and left pairs of front and rear lateral walls extending respectively from said second front and rear end walls rightward and leftward in the first longitudinal direction to form rightmost and leftmost pairs of front and rear end portions, respectively, each of said lateral walls having upper and lower surfaces opposite to each other in the second transverse direction; and
    rightmost and leftmost bracing walls disposed opposite to each other in the first longitudinal direction and interconnecting said rightmost and leftmost pairs of said front and rear end portions respectively so as to constitute uninterrupted upper and lower peripheral portions respectively on said upper and lower surfaces of said lateral walls;

each of said front and rear lateral walls in said right and left pairs having a pair of mounting holes respectively disposed in said front and rear lateral walls in alignment with each other in the first transverse direction and adapted to be disposed outboard to the first front and rear ends of the hollow tube respectively so as to constitute a third axis parallel to the first transverse direction, said pairs of mounting holes being disposed to be proximate to said rightmost and leftmost bracing walls respectively and proximate to said upper and lower surfaces of said lateral walls in symmetry to each other relative to the first axis;

each of said front and rear lateral walls of a respective one of said right and left pairs having a set of upper and lower abutment walls spaced apart from each other in the second transverse direction so as to define an accommodation channel which provides passage in the first transverse direction and which is adapted to receive a respective one of the first and second lug members, said sets of upper and lower abutment walls, which are disposed in said right pair of front and rear lateral walls respectively, being disposed distal to said rightmost bracing wall relative to the first axis, and in symmetry to the other said sets of upper and lower abutment walls in said left pair of front and rear lateral wall respectively, each of said sets of upper and lower abutment walls further defining upper and lower tightening holes therein which are aligned with each other so as to be adapted to constitute a fourth axis with the respective one of the lug members parallel to the second transverse direction, thereby permitting a respective one of the lug members to be tightened between the respective set of said upper and lower abutment walls along said fourth axis.

* * * * *